United States Patent [19]

Strickland

[11] 4,082,063
[45] Apr. 4, 1978

[54] ALTERNATELY ASCENDING AND DESCENDING AQUATIC ARTICLE

[76] Inventor: Robert E. Strickland, 1965 S. Beverly Glen Blvd., West Los Angeles, Calif. 90025

[21] Appl. No.: 716,661

[22] Filed: Aug. 23, 1976

[51] Int. Cl.² ............... A01K 63/00; A63H 23/10
[52] U.S. Cl. ............................................. 119/5; 46/92
[58] Field of Search .............. 119/5; 46/91, 92, 93, 46/94; 272/8 N; 273/1 L

[56] References Cited

U.S. PATENT DOCUMENTS

| | | | |
|---|---|---|---|
| 1,991,626 | 2/1935 | Rawdon | 272/8 N |
| 2,932,916 | 4/1960 | Strickland | 46/92 |
| 3,265,388 | 8/1966 | Kane | 119/5 X |
| 3,326,184 | 6/1967 | Greenbaum | 119/5 |

Primary Examiner—Hugh R. Chamblee

[57] ABSTRACT

A swivel connection between one end of a tether and a figure having a buoyancy chamber permits the figure to rotate relative to the tether. The figure is heavier than water when the chamber is filled with water and lighter than water when the chamber is filled with gas. The tether is secured to the bottom of a water container at a point spaced along the tether from the end with the swivel connection. A plurality of holes in the figure establish communication between the chamber and the outside of the figure. Gas is supplied to the chamber at a rate alternately to cause the figure to ascend and descend. Preferably, gas is supplied to the buoyancy chamber by an air pump, which could be an aquarium air pump, through a length of flexible tube, which serves as the tether.

17 Claims, 9 Drawing Figures

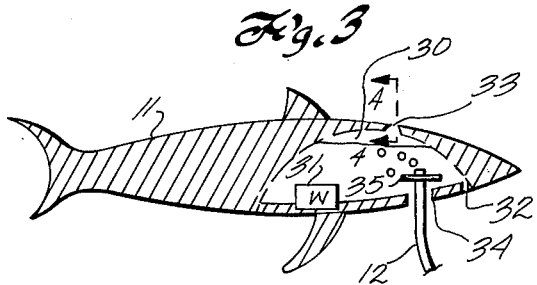
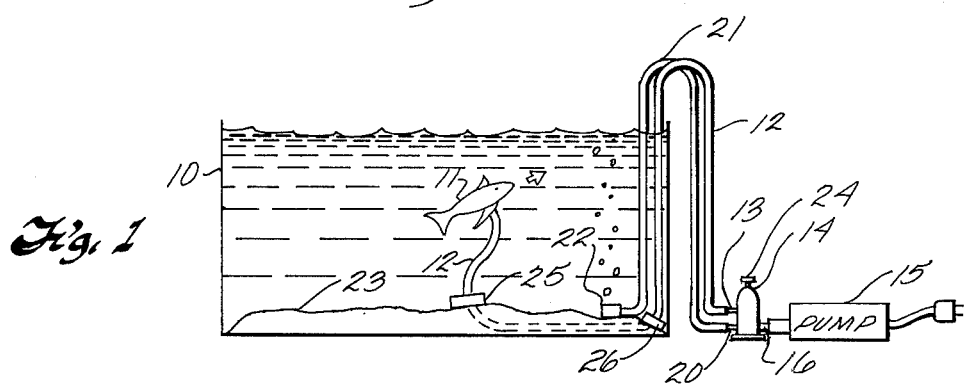
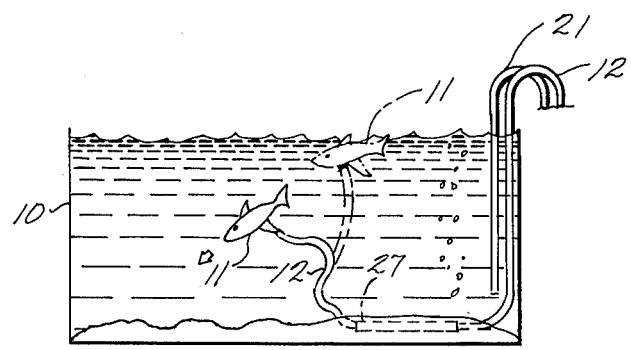

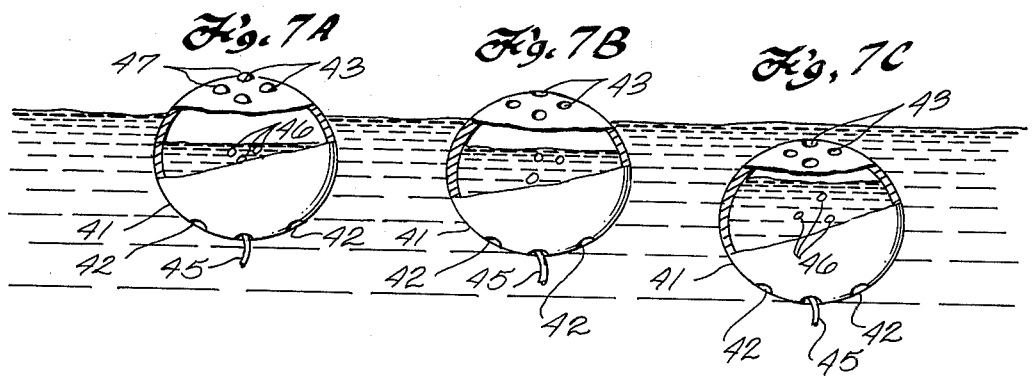
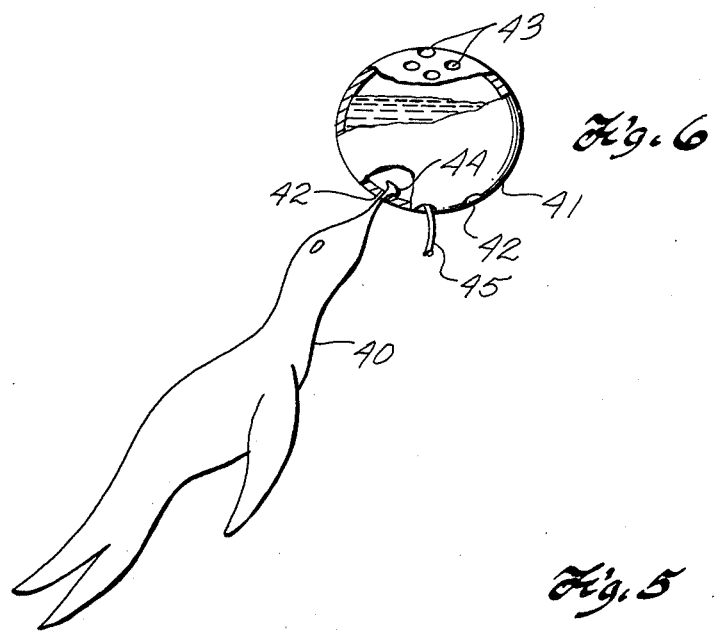
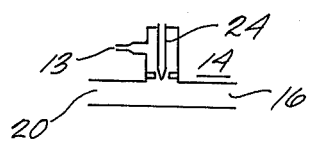

ALTERNATELY ASCENDING AND DESCENDING AQUATIC ARTICLE

BACKGROUND OF THE INVENTION

This invention relates to aquatic articles that alternately ascend and descend and, more particularly, to an aquatic article for use in a water container, such as an aquarium.

It is known to use a gas to operate an alternately surfacing and submerging unrestrained aquatic toy or other article. See, for example, my U.S. Pat. No. 2,932,916 which issued Apr. 19, 1960. In one embodiment, such an article comprises a figure having a buoyancy chamber containing a gas-generating material, one or more downwardly directed water ports leading to the buoyancy chamber, and one or more upwardly directed gas vent openings leading from the buoyancy chamber. When the figure is completely submerged, a water-gas seal is formed across the vent openings by surface tension. As a result, the gas pressure in the chamber rises, water is expelled from the chamber, the specific gravity of the figure becomes less than one, and the figure ascends to the water surface. When the vent openings are exposed to the atmosphere at the water surface, the water-gas seal breaks. As a result, the gas pressure in the chamber drops, water enters the ports, the specific gravity of the figure becomes greater than one, and the figure descends until the specific gravity of the figure again becomes less than one. Then, the cycle repeats.

It is also known to use air supplied by the aeration pump of an aquarium to operate an article remaining at the bottom of the aquarium, such as, for example, a clam shell that is repeatedly opened and closed.

SUMMARY OF THE INVENTION

According to the invention, a figure having a buoyancy chamber is tied by a tether to the bottom of a water container, such as an aquarium, to permit the figure to move about within the limits imposed by the length of the tether. The figure is heavier than water when the chamber is filled with water and lighter than water when the chamber is filled with gas. There is a swivel connection between the tether near one end and the figure to permit the figure to rotate relative to the tether. Preferably, the tether is secured to the bottom of the water container at a point spaced along the tether from the figure a distance sufficient to permit the figure to surface. A plurality of holes in the figure establish communication between the chamber and the outside of the figure. Gas is supplied to the chamber at a rate alternately to raise the figure by expelling water from the chamber through one or more of the plurality of holes and to sink the figure by releasing the supplied gas from the chamber through one or more of the plurality of holes. By virtue of the tether, the figure performs interesting and entertaining maneuvers of a different nature than an unrestrained figure.

A feature of the invention is to supply gas to the buoyancy chamber from an air pump, such as an aquarium aeration pump, through a flexible tube, which serves as the tether.

BRIEF DESCRIPTION OF THE DRAWINGS

The features of specific embodiments of the best mode contemplated for carrying out the invention are illustrated in the drawings, in which:

FIG. 1 is a side elevation view of an aquarium and an alternately surfacing and submerging aquatic article incorporating the principles of the invention during ascent to the water surface;

FIG. 2 is a side elevation view of the aquarium and aquatic article of FIG. 1 during descent from the water surface;

FIG. 3 is a side sectional view of the shark figure of FIG. 1;

FIG. 4 is a front sectional view taken through the plane indicated in FIG. 3;

FIG. 5 is a schematic diagram of the three-port fitting of FIG. 1;

FIG. 6 is a side view partially in section of the figure of a seal balancing a ball on its nose; and FIGS. 7A, 7B, and 7C are side partially sectional views of the ball of FIG. 6 illustrating the operation of the alternately surfacing and submerging article including the ball of FIG. 6.

DETAILED DESCRIPTION OF THE SPECIFIC EMBODIMENTS

In FIGS. 1 and 2, an alternately ascending and descending aquatic article located in an aquarium 10 includes a figure 11 of a shark and a flexible, clear plastic tube 12. One end of tube 12 is secured to shark figure 11 and the other end of tube 12 is connected to an outlet port 13 of a three-port fitting 14. In a typical embodiment, tube 12 is a thin-walled clear plastic tubing having a 0.050 outside diameter (e.g. No. 22 surgical tubing). The outlet of a conventional aquarium aeration pump 15 is connected to an inlet port 16 of fitting 14. An outlet port 20 of fitting 14 is connected by a tube 21 to a conventional aquarium aerator and/or filter 22 in the aquarium 10.

As illustrated schematically in FIG. 5, fitting 14 has a direct, unrestricted passage between ports 16 and 20, which carries most of the air supplied by pump 15 to tube 21 for aerating and/or filtering aquarium 10. Fitting 14 also has a restricted passage from port 16 to port 13, in which an axially adjustable needle valve 24 controls the rate of air flow to flexible tube 12. Air is fed to shark figure 11 through fitting 14 and tube 12 at a very low flow rate.

In the embodiment of FIG. 1, tube 12 is buried in gravel 23 as it extends from the edge of aquarium 10 to a central point of aquarium 10 on the surface of gravel 23 at which point an annular weight 25 is attached to tube 12. An annular weight 26 is attached to tube 12 at the edge of aquarium 10. Weights 25 and 26 have a specific gravity substantially greater than one. Weights 25 and 26 and the gravel over tube 12 serve to secure tube 12 to the bottom of aquarium 10. The length of the portion of tube 12 between weight 25 and shark figure 11 is preferably slightly greater than the distance between the water surface and the surface of gravel 23, e.g., one or two inches greater. This permits shark figure 11 to circumnavigate the region above weight 25. Weight 25 is located, ideally, near the center of aquarium 10 or in a clear area to permit shark figure 11 to move about without becoming entangled in obstructions such as plants, and without colliding with the sides of aquarium 10.

In the embodiment of FIG. 2, tube 12 is secured to the bottom of aquarium 10 by alternative means. Tube 12 passes through a rigid conduit 27, which extends from the edge of aquarium 10 under the surface of gravel 23 to a point near the center of aquarium 10. Conduit 27 has a specific gravity substantially greater than one.

In both embodiments, weights 25 and 26 and conduit 27 are sufficiently heavy to hold the portion of tube 12 on the bottom of aquarium 10 steady as the aquatic article operates.

In FIGS. 3 and 4, shark figure 11 is shown in detail. Shark figure 11 has a forward end at the right of FIG. 3 and a rearward end to the left of FIG. 3. Shark figure 11 also has a top at the top of FIG. 3 and a bottom at the bottom of FIG. 3. Shark figure 11, which is preferably made from polyethylene with a specific gravity slightly less than one, has a forwardly oriented buoyancy chamber 30. A weight 31 made of a material having a specific gravity substantially larger than one is located near the rear of the bottom of buoyancy chamber 30 substantially as shown below and rearward of the center of buoyancy of figure 11. (The center of buoyancy of figure 11 is the center of gravity of the water displaced by figure 11.) When buoyancy chamber 30 is filled with water, the combined specific gravity of shark figure 11 and weight 31 is greater than one. When buoyancy chamber 30 is filled with gas, the combined specific gravity of shark figure 11 and weight 31 is slightly less than one. Thus, when buoyancy chamber 30 is filled with water, shark figure 11 is heavier than water, and when buoyancy chamber 30 is filled with gas, shark figure 11 is lighter than water. One or more downwardly oriented water ports in shark figure 11 establish communication between buoyancy chamber 30 and the outside of shark figure 11. A plurality of upwardly oriented gas vents in shark figure 11 establish communication between buoyancy chamber 30 and the outside of shark figure 11. (FIG. 4.) The diameter of each of gas vents 33 is substantially smaller, e.g., 0.060 inches, than the diameter of water ports 32, e.g., 0.110 inches. The end of tube 12 passes through an oversized hole 34 in shark figure 11 into buoyancy chamber 30, to permit shark figure 11 to rotate freely relative to tube 12. An annular washer having a larger diameter than hole 34 is attached to the end of tube 12 to secure it within buoyancy chamber 30 and prevent its removal therefrom.

In operation, when shark figure 11 is submerged, a water-gas seal is formed across vents 33 due to surface tension. Thus, the air supplied to buoyancy chamber 30 through tube 12 stays within buoyancy chamber 30, and raises the pressure therein, and expells water therefrom. Consequently, the specific gravity of shark figure 11 (inclusive of weight 31) becomes less than one and shark figure 11 rises to the water surface, as illustrated in FIG. 1. When shark figure 11 reaches the water surface, vents 33 become exposed to the atmosphere, and when there is sufficient weight exerting pressure on the water-gas seals (combination of in-water, and out-of-water weight as the top of the figure pushes above the surface), the water-gas seal is broken, air is released from buoyancy chamber 30, the pressure therein drops, and water enters buoyancy chamber 30 through ports 32 and hole 34. Consequently, the specific gravity of shark figure 11 (inclusive of weight 31) becomes greater than one and shark figure 11 turns as depicted in phantom in FIG. 2 and begins to descend. It should be noted vents 33 lie approximately in a horizontal plane, and have a conical entry providing a relatively sharp rim at the outer surface of figure 11, thereby improving sensitivity to and reliability of the breaking of the seal. The water-gas seal is re-established across vents 33 when they become submerged, the pressure in buoyancy chamber 30 rises, and the water is gradually expelled from buoyancy chamber 30 as shark figure 11 descends until its specific gravity again becomes less than one, at which time the cycle is repeated.

The depth of submersion of shark figure 11 before its specific gravity becomes less than one depends upon the rate of air flow thorugh tube 12 into buoyancy chamber 30. The lower the air flow rate, the further shark figure 11 descends. If the air flow rate is too high, shark figure 11 does not descend at all, but remains at the water surface.

In order that shark figure 11 assumes a natural swimming attitude, i.e., its nose heads upward during ascent and downward during descent, or stated differently, its rearward end follows its forward end, shark figure 11 is designed so its center of gravity is slightly rearward and below the center of buoyancy during ascent, thereby directing the nose upward, and is slightly forward of and below the center of buoyancy during descent, thereby directing the nose downward. In other words, as water enters buoyancy chamber 30 to increase the specific gravity of shark figure 11 from below one to above one, the center of gravity of shark figure 11 shifts from rearward of the center of buoyancy to forward thereof.

Flexible tubing 12 serves two functions—as a tether for restraining, i.e., limiting the range of shark figure 11 and as a gas supply for buoyancy chamber 30. As shark figure 11 reaches the water surface and begins to descend as illustrated in phantom in FIG. 2, it normally reaches the end of the tether and is suddenly restrained thereby to cause a change in its direction. Consequently, shark figure 11 circumnavigates aquarium 10 as it alternately surfaces and submerges in an interesting and entertaining pattern. When the rate of air flow to buoyancy chamber 30 is relatively high, shark figure 11 sometimes reaches the end of its tether before it reaches the water surface and the resulting impact may break the water-air seal and initiate the descent of shark figure 11; this provides an interesting deviation from the normal pattern of ascent to the water surface. Interaction of the swimming figure with the resisting elasticity of the tubing as it coils and uncoils adds further variety to the pattern of movement.

The second function provided by tube 12 is to supply gas to buoyancy chamber 30. It is preferable to supply gas to buoyancy chamber 30 from aeration pump, if available. However, if no air pump is available, a gas generating material could be placed in buoyancy chamber 30 as taught in my above-referenced patent and tube 12 could be replaced by a solid flexible line. In a toy adaptation of this device for sinks, tubs, swimming pools, etc., the flexible hollow tube can be supplied gas by hand bulb or bellows, or by being blown into. The tube can be attached to the bottom of the water container or can be free to move, i.e., be unattached.

In FIG. 6, a different figure is shown, namely, a seal 40 that balances a hollow ball 41. Seal 40 is solid, i.e., without a buoyancy chamber, and is made from a material having a specific gravity as close to one as possible. Ball 41 has a plurality of downwardly oriented water ports 42 and smaller, upwardly oriented gas vents 43. The nose 44 of seal 40, which passes through one of ports 42, has a blunted enlarged end inside ball 41 with a larger diameter than port 42, through which nose 44 passes. Ball 41 is either itself made of a material with a specific gravity larger than one or provided with a weight so its specific gravity when filled with water is greater than one and its specific gravity when filled with gas is less than one. A tube 45 supplies air to the interior of ball 41 from an aeration pump in the same fashion as tube 12 in the embodiment of FIGS. 1 through 4. A swivel connection is provided between tube 45 and ball 41 in the same manner as the embodiment of FIGS. 1 through 4.

FIGS. 7A through 7C illustrate the water line inside ball 41 during operation of the figure of FIG. 6. As illustrated by bubbles 46 in FIGS. 7A through 7C, air is continuously supplied by tube 45 to the interior of ball 41. While ball 41 is submerged, a water-gas seal is formed across gas vents 43. When gas vents 43 become exposed to the atmosphere as ball 41 reaches the water surface, the water films extending across vents 43 expand outwardly due to the pressure differential to form bubbles 47 as illustrated in FIG. 7A, and then burst as a result of in-water and above-water weight to break the water-gas seal. As a result, the pressurized air in ball 41 escapes through vents 43 and the water level in ball 41 rises, as depicted in FIG. 7B. The water level within ball 41 rises until the specific gravity of ball 41 becomes greater than one, at which time ball 41 begins to descend, as depicted in FIG. 7C. As ball 41 descends, vents 43 become submerged, the water-gas seals are re-established, and air begins to accumulate once again inside ball 41. Ball 41 descends until the water level drops sufficiently for the specific gravity of ball 41 to become less than one, at which time ball 41 begins to ascend once more. Ball 41 ascends until vents 43 are exposed once again to the atmosphere, and sufficient weight is brought to bear on the vent seals at which time the described cycle repeats.

Seal figure 40 is free to pivot and/or rotate about ball 41. As ball 41 ascends, seal 40 trails behind it with its nose above its tail, and as ball 41 descends, seal trails ball 41 with its tail above its nose. Thus, seal figure 40 always appears to be following, pushing, and balancing ball 41.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, other types of figures such as scuba divers, submarines, octopi, or hard hat divers could be utilized, and also as a toy in water receptacles other than aquariums. To provide a vertically ascending and descending figure, the center of gravity and center of buoyancy are vertically aligned. The swivel connection between the flexible tube and the figure could take other forms that permit free rotation of the figure or, to produce a somewhat different pattern, restricted or limited rotation of the figure. If a pattern is desired where the figure does not ascend up to the water surface, the tether could be shorter in length than the distance from the water surface to bottom of the aquarium and a large gas flow rate could be used. Or in some embodiments a tube unattached to the bottom of the water container could be used to supply gas to a figure, which is unrestrained.

What is claimed is:

1. An article of manufacture for use in a water container comprising:
    a figure having a buoyancy chamber, the figure being heavier than water when the chamber is filled with water and lighter than water when the chamber is filled with gas;
    a tether having first and second ends;
    swivel connection means between the tether near the first end and the figure for permitting the figure to rotate relative to the tether;
    means for securing the tether to the bottom of a water container at a point spaced along the tether from the first end;
    a plurality of holes in the figure establishing communication between the chamber and the outside of the figure; and
    means for supplying gas to the chamber at an uninterrupted rate alternately to raise the figure by expelling water from the chamber through one or more of the plurality of holes and to sink the figure by releasing the supplied gas from the chamber through one or more of the plurality of holes.

2. The article of claim 1, in which the supplying means comprises a gas pump with an outlet and the tether comprises a flexible tube, one end of which is connected to the outlet of the gas pump and the other end of which is connected to the buoyancy chamber to carry gas from the gas pump to the buoyancy chamber.

3. The article of claim 2, in which the swivel connection means comprises an oversized hole in the figure through which the other end of the tube passes into the buoyancy chamber and an annular washer secured to the other end of the tube within the buoyancy chamber, the annular washer having a larger diameter than the oversized hole, thereby preventing removal of the other end of the tube from the buoyancy chamber.

4. The article of claim 1, in which the swivel connection means comprises an oversized hole in the figure through which the first end of the tether passes into the buoyancy chamber and an annular washer secured to the first end of the tether within the buoyancy chamber, the annular washer having a larger diameter than the oversized hole, thereby preventing removal of the first end of the tether from the buoyancy chamber.

5. The article of claim 1, in which the figure has a forward end and a rearward end that follows the forward end as the figure is raised and sunk by the gas supply means, the figure having a center of buoyancy, and the figure having a center of gravity as the figure is being raised located between the center of buoyancy and the rearward end of the figure and a center of gravity as the figure is being sunk located between the center of buoyancy and the forward end of the figure.

6. The article of claim 5, in which the figure has a top and a bottom that lies under the top as the figure is raised and sunk by the gas supplying means, the center of gravity of the figure as it is being raised and sunk being located closer to the bottom of the figure than the center of buoyancy of the figure.

7. The article of claim 1, in which the figure comprises an integral body of plastic with a specific gravity less than one and a weight having a specific gravity substantially greater than one located in the buoyancy chamber below and rearward of the center of buoyancy of the figure.

8. The article of claim 1, in which the figure comprises: p1 a hollow ball in which the buoyancy chamber is located, the ball being heavier than water when the chamber is filled with water and lighter than water when the chamber is filled with gas, the plurality of holes in the figure being formed in the ball; and a seal figure having a nose passing through one of the holes, the nose having an enlarged end inside the ball that is larger than the hole through which the nose passes, thereby preventing removal of enlarged end of the nose from the ball.

9. The article of claim 1, in which the plurality of holes comprises one or more downwardly oriented water ports and one or more upwardly oriented gas vents having a smaller diameter than the one or more water ports.

10. In combination with an aeration pump and an aquarium containing water and having an underwater bottom surface, an alternately surfacing and submerging aquatic article comprising:
   a figure having a buoyancy chamber, the figure having a specific gravity greater than one when the chamber is filled with water and a specific gravity less than one when the chamber is filled with gas;
   a plurality of holes in the figure establishing communication between the buoyancy chamber and the outside of the figure;
   a flexible tube continuously connecting the aeration pump to the buoyancy chamber to supply air to the buoyancy chamber at a rate alternately to raise the figure to the water surface by expelling water from the chamber through one or more of the plurality of holes and to sink the figure below the water surface by releasing the supplied gas from the chamber through one or more of the plurality of holes;
   first means for securing the flexible tube to the figure so the figure is rotatable relative to the tube; and
   second means for securing the tube to the bottom surface of the aquarium such that the length of the tube between the first and second securing means is slightly greater than the distance between the bottom surface and the water surface.

11. The article of claim 10, in which the second securing means comprises a rigid conduit on the bottom surface of the aquarium, through which the flexible tube passes, the rigid conduit having a specific gravity substantially greater than one.

12. The article of claim 10, in which the first securing means comprises an oversized hole in the figure through which one end of the tube passes into the buoyancy chamber and an annular washer secured to the one end of the tube within the buoyancy chamber, the annular washer having a larger diameter than the oversized hole, thereby preventing removal of the one end of the tube from the buoyancy chamber.

13. The article of claim 10, in which the first securing means secures the flexible tube to the figure so the figure is freely rotatable relative to the tube.

14. An article of manufacture for use in a water container comprising: p1 a figure having a buoyancy chamber, the figure being heavier than water when the chamber is filled with water and lighter than water when the chamber is filled with gas;
   a flexible tube having first and second ends;
   a plurality of holes in the figure establishing communication between the chamber and the outside of the figure; and
   a swivel connection means between the tube near the first end and the figure for permitting the figure to rotate relative to the tube, the first end of the tube opening into the chamber to establish communication between the first end of the tube and the plurality of holes;
   the second end of the tube being adapted to receive gas under pressure for conveyance through the tube to the chamber.

15. The article of claim 14, additionally comprising means for supplying gas to the second end of the tube at a rate alternately to raise the figure by expelling water from the chamber through one or more of the plurality of holes and to sink the figure by releasing the supplied gas from the chamber through one or more of the plurality of holes.

16. The article of claim 14, additionally comprising a hand pump connected to the second end of the tube.

17. The article of claim 14, additionally comprising means for securing the tube to the container.

* * * * *